United States Patent [19]

Lazzari et al.

[11] 3,961,299

[45] June 1, 1976

[54] MAGNETIC CIRCUIT HAVING LOW RELUCTANCE

[75] Inventors: Jean-Pierre Lazzari, Seyssinet; Igor Melnick, Grenoble, both of France

[73] Assignees: Commissariat a l'Energie Atomique, Paris; Compagnie Internationale pour l'Informatique, Louveciennes, both of France

[22] Filed: Nov. 5, 1973

[21] Appl. No.: 412,544

Related U.S. Application Data

[63] Continuation of Ser. No. 294,601, Oct. 3, 1972, abandoned, which is a continuation of Ser. No. 81,887, Oct. 19, 1970, abandoned.

[30] Foreign Application Priority Data

Oct. 28, 1969 France .............................. 69.36864

[52] U.S. Cl. .............................. 336/218; 336/219; 336/233; 360/126
[51] Int. Cl.² .................... H01F 27/24; G11B 5/16
[58] Field of Search ............ 360/126; 336/218, 219, 336/233; 340/174 TF, 174 PA; 29/94, 195, 196.6

[56] References Cited
UNITED STATES PATENTS

| | | | |
|---|---|---|---|
| 3,343,145 | 9/1967 | Bertelson | 29/196.6 |
| 3,480,929 | 11/1969 | Bergman | 340/174 TF |
| 3,488,167 | 1/1970 | Chang et al. | 340/174 TF |
| 3,516,076 | 6/1970 | Stein | 340/174 TF |
| 3,553,660 | 1/1971 | Wolf | 340/174 TF |

*Primary Examiner*—Robert S. Tupper
*Attorney, Agent, or Firm*—Cameron, Kerkam, Sutton, Stowell & Stowell

[57] ABSTRACT

A magnetic circuit which exhibits low reluctance on the path of a magnetic flux and comprises at least one anisotropic thin film formed of an iron-nickel-chromium alloy through which said magnetic flux passes in the hard direction of magnetization of the film.

2 Claims, 4 Drawing Figures

MAGNETIC CIRCUIT HAVING LOW RELUCTANCE

This is a continuation of application Ser. No. 294,601 filed Oct. 3, 1972, which was a continuation of Ser. No. 81,887 filed Oct. 19, 1970, both now abandoned.

This invention relates to a magnetic circuit having low reluctance for the passage of a magnetic flux which propagates along a predetermined path in said magnetic circuit. This can be achieved only when the material which constitutes the magnetic circuit has high magnetic permeability and if said circuit which conducts the magnetic flux is of sufficient cross-sectional area. The invention accordingly proposes a magnetic circuit consisting of one or a number of film layers which exhibit high permeability and are of sufficient thickness.

It is known that anisotropic magnetic thin films exhibit high permeability along the axis of hard magnetization or so-called hard direction but the small thickness of films which are known to possess this property up to the present time results in a considerable increase in the reluctance of circuits in which such films are employed.

In FIG. 1 which illustrates an antisotropic thin film of magnetic material, the easy and hard directions of magnetization of the sample shown are indicated respectively by the arrows 1 and 2. In the easy direction of magnetization 1, positive (+) and negative (−) electric charges appear respectively on the walls 3 and 4 of the sample. The number of these charges increases as the thickness $e$ of the sample is greater and the width $l$ is smaller. Said charges give rise to a demagnetizing field $H_d$ which is oriented from the face 3 towards the face 4. If the value $H_d$ is smaller than or equal to that of the coercive field $H_c$ of the sample, the magnetic properties of the film are not disturbed and, in particular, the permeability is retained. On the other hand, if the value of the demagnetizing field $H_d$ is higher than that of the coercive field $H_c$, the film becomes misoriented and the magnetic permeability decreases. The value of the demagnetizing field $H_d$ depends on the dimensions and on the shape of the film. Two cases can accordingly arise, depending on whether the film under consideration has either a large or a small surface area.

In the case of large areas, the magnetization vector is practically proportional to the magnetic field which is applied along the hard direction 2 of magnetization and the permeability is high if a field having low anisotropy is obtained. However, as soon as the film attains a thickness of 0.5 $\mu$, its magnetic properties deteriorate and, in particular, the permeability decreases considerably. It was therefore necessary in the case of large surface areas to find a material which would retain its magnetic properties in thin films of substantial thickness.

In the case of thin films having small surface areas, the magnetization cannot be directed at right angles to the plane of the film. As long as the two dimensions, namely the width $l$ and length L of the sample, are large in comparison with its thickness $e$, the film remains correctly oriented and the easy and hard directions of magnetization 1 and 2 respectively are well defined. However, if the thickness $e$ of the film is not negligible with respect to the width $l$ of the sample (dimension along the easy direction 1 of magnetization), the demagnetizing field $H_d$ becomes higher than or equal to the coercive field $H_c$. The edge effects are in that case no longer negligible; the film becomes misoriented, walls are created and permeability decreases. The manufacture of a magnetic circuit having a small surface area and low losses becomes practically impossible under these conditions.

The invention provides a magnetic circuit consisting of one or a number of thin films which corresponds to practical requirements more effectively than those of the prior art, especially by virtue of the fact that the circuit is not subject to the disadvantages mentioned above.

The invention is primarily intended to ensure that very low reluctance is set up in opposition to the passage of a magnetic flux which propagates within said circuit.

To this end, the invention proposes a magnetic circuit which exhibits low reluctance on the path of a magnetic flux, said circuit being characterized in that it comprises at least one anisotropic thin film formed of ironnickel-chromium alloy through which said magnetic flux passes in the hard direction of magnetization of said film.

In a first embodiment of the invention, said magnetic circuit comprises a single iron-nickel-chromium film having a thickness at least equal to 0.5 $\mu$.

In a second embodiment of the invention, the magnetic circuit comprises an alternate stack of anisotropic thin films of iron-nickel-chromium alloy and of non-magnetic thin films so that the demagnetizing fields of two successive films of iron-nickel-chromium alloy should be in opposite directions, said iron-nickel-chromium films being provided in an even number and the thickness of said nonmagnetic films being such that the value of the difference between the demagnetizing fields of two successive film layers of iron-nickel-chromium alloy should be equal at a maximum to the value to the coercive field of each ironnickel-chromium layer.

The iron-nickel-chromium alloy which is employed is preferably formed by addition of 2.5% chromium to a mixture of 83% iron and 17% nickel.

A clearer understanding of the invention will be gained from the following description of two modes of execution of the invention which are given by way of non-limitative example, reference being made in the description to the accompanying drawings, in which.

In order to obtain high magnetic permeability in thin films, one solution consists in choosing an anisotropic material such as iron-nickel 83–17 (83% iron and 17% nickel) which is employed along the hard direction of magnetization. However, as soon as the film thickness attains 0.5 $\mu$, the magnetic properties of the iron-nickel alloy deteriorate and, in particular, the permeability decreases to a considerable extent. The iron-nickel-chromium alloy (iron-nickel 83–17 with an addition of 2.5% chromium) has already been employed in the manufacture of magnetic memory devices, each memory device being made up of a thin film having a thickness equal to a maximum value of 0.4 μ.

In accordance with the present invention, the iron-nickel-chromium alloy can be employed for the manufacture of low-reluctance magnetic circuits up to film thicknesses of 3 μ. In point of fact, the inventors have found that a thin film of Fe-Ni-Cr alloy having a large surface area retains its magnetic properties up to thicknesses in the vicinity of 3 μ. The hysteresis cycles which are obtained in the hard direction of magnetization of an iron-nickel-chromium film having a thickness greater than 0.5 μ are highly closed, which shows that the material has minimum loss.

Figure 2:
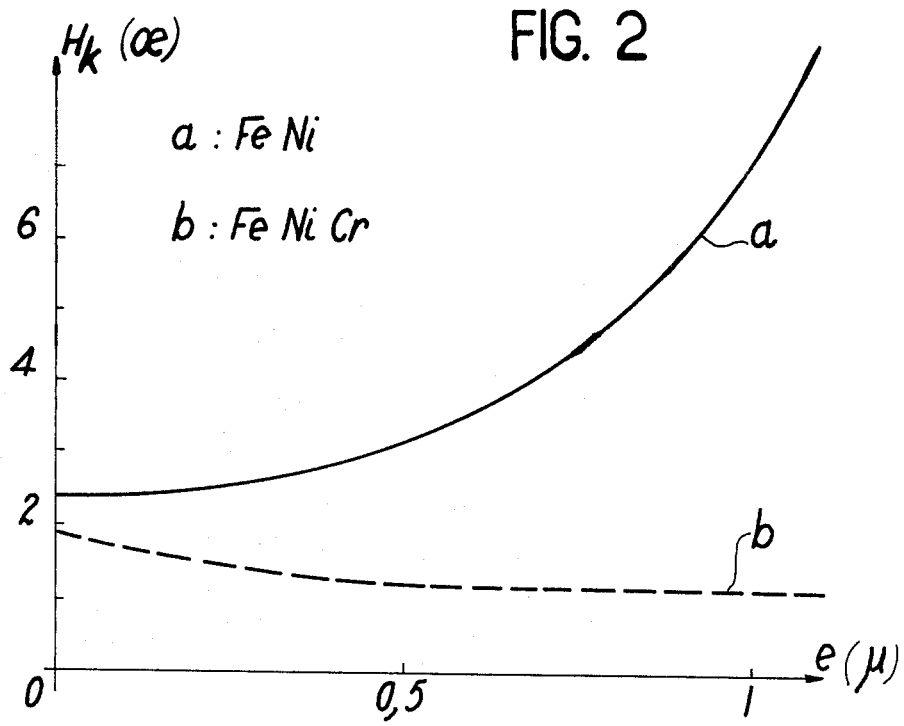
FIG. 2 represents the value of the anisotropy field $H_k$ expressed in oersteds as a function of the thickness $e$ of the magnetic film as expressed in $\mu$.

In FIG. 2 which represents the value of the anisotropy field $H_k$ expressed in oersteds as a function of the thickness $e$ of the magnetic layer as expressed in μ, it is to be noted that, in respect of the same film thickness, the value of the anisotropy field of the iron-nickel alloy (curve $a$) is distinctly higher than that of the iron-nickelchromium alloy (curve $b$), which corresponds to a much lower permeability.

Figure 3:
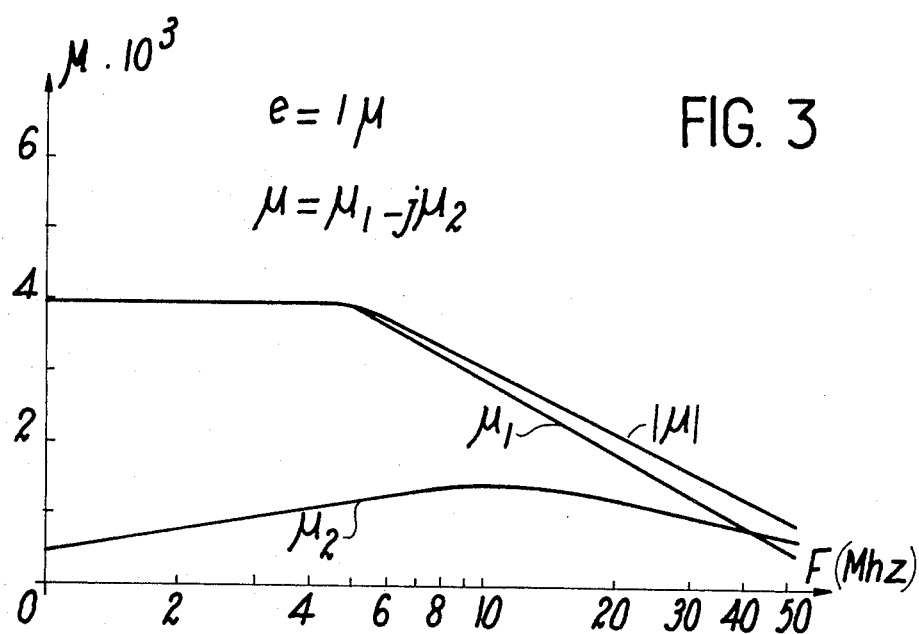
FIG. 3 represents the value of permeability of an Fe—Ni—Cr film as a function of the excitation frequency F expressed in Mc/s.

FIG. 3 represents the value of permeability μ of an iron-nickel-chromium film having a thickness which is equal to 1 μ as a function of the excitation frequency F expressed in Mc/s. The permeability μ is a complex quantity and is expressed by the relation:

$$\mu = \mu_1 - j\mu_2,$$

wherein $j^2 = -1$.

The values of $\mu_1$, $\mu_2$ and of the modulus of $\mu$ (represented by $\mu$) have been represented as a function of the excitation frequency F. It is noted that, in the case of a film having a thickness 1 μ, the value of permeability remains substantial.

Figure 1:
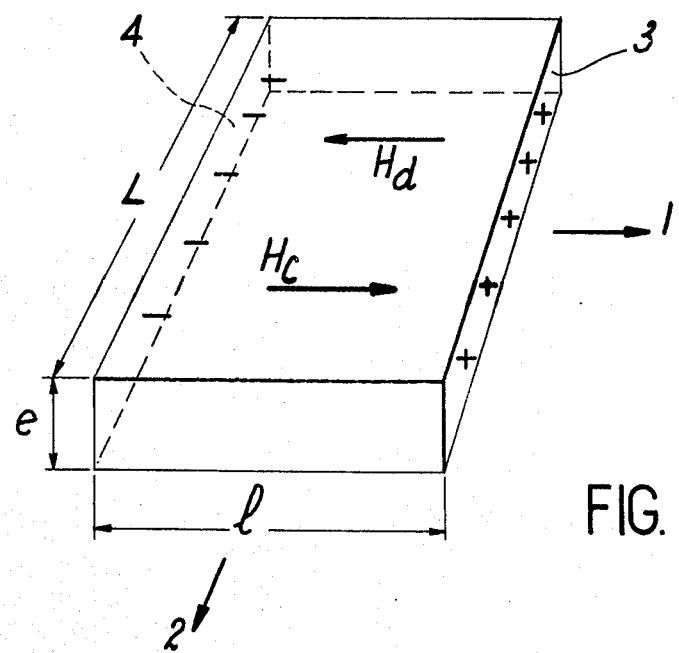
FIG. 1 illustrates diagrammatically a sample of an anisotropic film formed of magnetic material.
Figure 4:
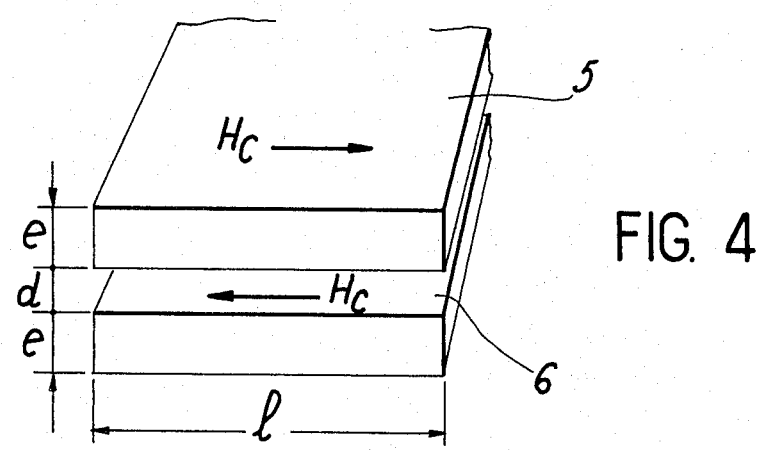
FIG. 4 shows a stack of two magnetic thin films in spaced relation.

In the case of small surface areas, the demagnetizing field arising from edge effects becomes higher than the coercive field of the film and the invention accordingly gives practical effect to a theory which is already known but has been neither applied nor utilized heretofore in order to obtain a magnetic circuit in low-loss thin films (J. M. Daughton and H. Chang, Journal of Applied Physics, vol. 36, No. 3, March 1965, p 1124). In accordance with this theory, consideration is given to two identical films 5 and 6 (as shown in FIG. 4) which are formed of magnetic material, said films being spaced at a distance $d$ and such that their coercive field $H_c$ is oriented in opposite directions. It is noted that the demagnetizing fields $H_d$ will accordingly be in opposite directions. Thus, as a result of antiparallel orientation of the films 5 and 6, the value of the demagnetizing field of one of the films will be subtracted from that of the other film and conversely. If the value $\Delta H_d$ of the difference between the two demagnetizing fields is smaller than the value of the coercive field $H_c$ of the film considered, the films 5 and 6 are not misoriented but, on the contrary, the direction of magnetization of said films is in a stable position. When the thickness $e$ and the width $l$ of the films 5 and 6 are established, the condition $\Delta H_d < H_c$ is satisfied by determining the spacing $d$ of the films after having calculated the value of their demagnetizing field $H_d$. In fact, an extreme value of $d$ is set as an ultimate limit. The spacing $d$ can then be reduced to less than this value provided that the film considered is continuous and that there is an effective magnetic break between the two films 5 and 6.

By way of example, a magnetic circuit in accordance with the invention was fabricated from two films of ironnickel-chromium alloy having a thickness of 0.5 μ, a width of 300 μ and a length of 500 μ, the two films being separated by non-magnetic material (SiO) having a thickness of 0.1 μ. The value of the anisotropy field $H_k$ was not greater than 4 Oe whereas $H_k$ is in the vicinity of 16 Oe in respect of a same iron-nickel-chromium film having a thickness of 1 μ (therefore in respect of an equal thickness of magnetic material). This value of anisotropy field of 4 Oe is retained in the case of a stack consisting of a large number of identical magnetic films provided that provision is made for an equal number. Tests which have been performed with two Fe—Ni—Cr films each having a thickness of 1 μ and separated by a layer of SiO have produced the same results. Magnetic circuits formed of high-permeability thin films are therefore obtained while permitting the attainment of dimensions which, in the prior art, impaired the magnetic properties of circuits as a result of demagnetizing effects.

Magnetic circuits in accordance with the invention have been advantageously employed for the construction of integrated magnetic heads.

What we claim is:

1. A magnetic element comprising an alternate stack of anisotropic thin films of Fe-Ni-Cr alloy having an easy axis of magnetization and a hard axis of magnetization, a demagnetizing field and a coercive field and of non-magnetic insulating thin films, the demagnetizing field of two successive films of Fe—Ni—Cr being in opposite directions, said Fe—Ni—Cr films being even in number and said non-magnetic insulating films having a thickness providing a value of the difference between the emagnetizing fields of two successive films of Fe—Ni—Cr alloy equal at a maximum to the value of the coercive field of each Fe—Ni—Cr film.

2. The magnetic element as described in claim 1, said non-magnetic layers being formed of SiO.

* * * * *